US009117248B2

(12) United States Patent
King

(10) Patent No.: US 9,117,248 B2
(45) Date of Patent: Aug. 25, 2015

(54) SYSTEM AND METHOD FOR PROVIDING UTILITY CONSUMPTION AS SHOWN ON PERIODIC UTILITY BILLS AND ASSOCIATED CARBON EMISSIONS

(75) Inventor: Christopher Slaboszewicz King, Berkeley, CA (US)

(73) Assignee: eMeter Corporation, San Mateo, CA (US)

(*) Notice: Subject to any disclaimer, the term of this patent is extended or adjusted under 35 U.S.C. 154(b) by 1301 days.

(21) Appl. No.: 12/191,093

(22) Filed: Aug. 13, 2008

(65) Prior Publication Data

US 2009/0055299 A1 Feb. 26, 2009

Related U.S. Application Data

(60) Provisional application No. 60/964,382, filed on Aug. 13, 2007.

(51) Int. Cl.

| | |
|---|---|
| ***G07F 19/00*** | (2006.01) |
| ***H04M 15/00*** | (2006.01) |
| ***G06Q 40/00*** | (2012.01) |
| ***G05D 17/00*** | (2006.01) |
| ***G01R 19/00*** | (2006.01) |
| ***G01R 11/63*** | (2006.01) |
| ***G06Q 50/00*** | (2012.01) |
| ***G06Q 30/04*** | (2012.01) |
| ***G06Q 50/06*** | (2012.01) |

(52) U.S. Cl.

CPC ................ *G06Q 50/00* (2013.01); *G06Q 30/04* (2013.01); *G06Q 50/06* (2013.01)

(58) Field of Classification Search

CPC ....... G06Q 50/06; G06Q 30/04; G06Q 40/10; G05B 13/042; Y02E 20/14; G01R 11/60; H04M 11/002; G01D 4/002–4/008

USPC .......... 705/7, 34, 40, 412; 700/291, 300, 296, 700/266, 288, 286, 33; 345/440; 703/6; 324/103 R; 340/870.02; 375/260; 455/70

See application file for complete search history.

(56) References Cited

U.S. PATENT DOCUMENTS

| | | | | | |
|---|---|---|---|---|---|
| 5,216,623 | A | | 6/1993 | Barrett et al. | |
| 5,237,507 | A | * | 8/1993 | Chasek | 705/412 |
| 5,572,438 | A | * | 11/1996 | Ehlers et al. | 700/295 |
| 5,852,560 | A | * | 12/1998 | Takeyama et al. | 700/97 |

(Continued)

*Primary Examiner* — Olusegun Goyea

(57) ABSTRACT

Utility usage data of a customer in numeric form provided by the utility meter data collection system in usage intervals of not less frequent than daily intervals is received, along with billing-related data of the customer. The received utility usage data of the customer is converted from numeric form to a graphical form that shows the total daily usage information for a calendar period that matches that for the printed utility bill of the customer. The graphical form is printed on the printed utility bill or on a paper suitable for use as an insert accompanying the printed utility bill to be mailed to the customer. In another embodiment, electricity usage data of the customer is received, along with electricity generation data regarding quantity and percentages of a utility's total electricity generation attributable to at least two the following electricity generation sources: Natural Gas-Baseload, Natural Gas-Peaking, Coal, Hydro, Nuclear, and Renewable. Information is derived regarding proportion of the customer's actual electricity usage attributable to the sources of electricity generation from the electricity generation data and the electricity usage data. Preferably, the carbon emissions attributable to the customer's actual electricity usage is calculated and presented to the customer.

25 Claims, 4 Drawing Sheets

(56) References Cited

U.S. PATENT DOCUMENTS

| | | | | |
|---|---|---|---|---|
| 5,930,773 | A * | 7/1999 | Crooks et al. | 705/30 |
| 6,088,688 | A * | 7/2000 | Crooks et al. | 705/412 |
| 6,122,603 | A | 9/2000 | Budike, Jr. | |
| 6,195,018 | B1 * | 2/2001 | Ragle et al. | 340/870.01 |
| 6,226,600 | B1 * | 5/2001 | Rodenberg et al. | 702/61 |
| 6,366,889 | B1 * | 4/2002 | Zaloom | 705/7.37 |
| 6,487,508 | B1 * | 11/2002 | Suzuki et al. | 702/61 |
| 6,492,910 | B1 * | 12/2002 | Ragle et al. | 340/870.02 |
| 6,681,156 | B1 * | 1/2004 | Weiss | 700/291 |
| 6,732,055 | B2 * | 5/2004 | Bagepalli et al. | 702/32 |
| 6,734,806 | B1 | 5/2004 | Cratsley, III | |
| 6,820,045 | B1 * | 11/2004 | Asano et al. | 703/6 |
| 6,885,914 | B2 * | 4/2005 | Shimode et al. | 700/288 |
| 6,956,500 | B1 | 10/2005 | Ducharme et al. | |
| 7,043,459 | B2 * | 5/2006 | Peevey | 705/412 |
| 7,181,320 | B2 * | 2/2007 | Whiffen et al. | 700/286 |
| 7,191,736 | B2 * | 3/2007 | Goldman | 123/1 A |
| 7,392,115 | B2 * | 6/2008 | Schindler | 700/291 |
| 7,599,854 | B1 * | 10/2009 | Baum et al. | 705/26.1 |
| 2001/0010032 | A1 * | 7/2001 | Ehlers et al. | 702/62 |
| 2002/0091653 | A1 * | 7/2002 | Peevey | 705/412 |
| 2003/0007370 | A1 * | 1/2003 | Winter | 363/37 |
| 2003/0036918 | A1 * | 2/2003 | Pintsov | 705/1 |
| 2003/0220720 | A1 * | 11/2003 | Shimode et al. | 700/296 |
| 2004/0024717 | A1 * | 2/2004 | Sneeringer | 705/412 |
| 2004/0225649 | A1 * | 11/2004 | Yeo et al. | 707/3 |
| 2005/0055137 | A1 * | 3/2005 | Andren et al. | 700/291 |
| 2005/0192711 | A1 * | 9/2005 | Raines et al. | 700/286 |
| 2005/0258154 | A1 * | 11/2005 | Blankenship et al. | 219/130.01 |
| 2006/0001414 | A1 * | 1/2006 | Angerame et al. | 324/103 R |
| 2006/0020544 | A1 * | 1/2006 | Kaveski | 705/40 |
| 2006/0089851 | A1 * | 4/2006 | Silby et al. | 705/1 |
| 2006/0195334 | A1 * | 8/2006 | Reeb et al. | 705/1 |
| 2007/0124253 | A1 * | 5/2007 | Angerame et al. | 705/63 |
| 2007/0219932 | A1 * | 9/2007 | Carroll et al. | 705/412 |
| 2007/0255457 | A1 * | 11/2007 | Whitcomb et al. | 700/273 |
| 2008/0027885 | A1 * | 1/2008 | van Putten et al. | 705/412 |
| 2008/0052253 | A1 * | 2/2008 | Edwards et al. | 705/412 |
| 2008/0074284 | A1 * | 3/2008 | Edwards et al. | 340/870.02 |
| 2008/0195683 | A1 * | 8/2008 | Morgenthal | 708/209 |
| 2008/0228630 | A1 * | 9/2008 | Gotthelf et al. | 705/37 |
| 2008/0262857 | A1 * | 10/2008 | Perera | 705/1 |
| 2009/0012917 | A1 * | 1/2009 | Thompson et al. | 705/412 |
| 2009/0055299 | A1 * | 2/2009 | King | 705/34 |
| 2009/0304101 | A1 * | 12/2009 | LoPorto et al. | 375/260 |
| 2010/0249955 | A1 * | 9/2010 | Sitton | 700/33 |

* cited by examiner

SYSTEM AND METHOD FOR PROVIDING UTILITY CONSUMPTION AS SHOWN ON PERIODIC UTILITY BILLS AND ASSOCIATED CARBON EMISSIONS

CROSS-REFERENCE TO RELATED APPLICATION

This non-provisional application claims the benefit of provisional application No. 60/964,382, filed Aug. 13, 2007, which is incorporated herein by reference in its entirety.

BACKGROUND

The present invention relates in general to delivery of utility usage related information to customers, and in particular to a system and method for delivery of utility usage information that is helpful to the customer in managing their utility usage.

Utilities traditionally collect commodity usage data once during each billing period, which is usually either monthly or bimonthly for electricity, natural gas, and water. This is done typically by sending persons to the customer location to read a utility meter in a process known as "meter read." For most customers, this data is limited to a single figure for total consumption. For others, the data includes different values for peak and off-peak usage during the billing period, also limited to a single figure for total consumption at the relevant price (for example, peak) during the billing period.

More recently, advanced metering systems make it possible to obtain daily or more detailed usage data for customers, where the meters are capable of sending their readings to the metering system headend using radio or other remote communications and without the need for manually reading the meters. In addition to the utility reading provided by the meter read process, advanced metering systems also are programmable to provide more frequent periodic usage data for customers, such as hourly readings of the utility meters. These readings can be set to be taken at any time of the day or night.

In billing customers, utilities have provided the billing period totals with bills, whether printed or electronic. Many utilities often also provide a twelve-month history of the monthly consumption or a comparison of the past month's usage with usage in the same month of the prior year.

More detailed usage information is presented on many utility websites. U.S. Pat. No. 7,043,459 describes such a system. However, the detailed usage is not synchronized with or linked to the periodic utility bill. It is therefore desirable to provide a link between the detailed usage data and the bill associated with the usage that is useful to customers, such as by providing such information on or with customer utility bills.

The link between utility usage and climate change has been recognized by the public. This has led to a general awareness that every person on the planet should reduce the carbon emission footprint imposed by him or her. It is thus desirable to provide consumers a link between the individualized usage data with quantities of carbon emissions caused by individualized usage of electricity or natural gas. In this way consumers can understand the direct connection between their energy usage behavior and climate change.

SUMMARY OF THE INVENTION

One embodiment of one aspect of the invention is directed to a data management system. The system receives utility usage data of at least one customer in numeric form provided by the utility meter data collection system in usage intervals of not less frequent than daily intervals, and billing-related data of at least one customer. The billing-related data of the at least one customer is suitable for use in preparation of a utility bill of the at least one customer for a calendar period. The system may include an interface connected to a utility meter data collection system and an interface connected to a utility billing system for these purposes. The received utility usage data of the at least one customer is converted from numeric form to a first graphical form that shows the total daily usage information by day for a precise calendar period that matches that for the utility bill of the at least one customer. An application of the system may be used for this purpose. The first graphical form is then delivered to the customer with the utility bill. This can be done by printing the first graphical form on the printed utility bill or on a paper suitable for use as an insert accompanying the printed utility bill to be mailed to the at least one customer. Alternatively, the first graphical form is delivered with the utility bill electronically to the customer.

In another embodiment, a data management system receives electricity usage data of at least one customer and electricity generation data regarding quantity and percentages of a utility's total electricity generation attributable to at least two the following electricity generation sources: Natural Gas-Baseload, Natural Gas-Peaking, Coal, Hydro, Nuclear, and Renewable. An interface connected to a utility meter data collection system and an interface connected to an information provider may be used for such purposes. Information is derived regarding proportion of the at least one customer's actual electricity usage attributable to the sources of electricity generation from the electricity generation data and the electricity usage data.

All patents, patent applications, articles, books, specifications, other publications, documents and things referenced herein are hereby incorporated herein by this reference in their entirety for all purposes. To the extent of any inconsistency or conflict in the definition or use of a term between any of the incorporated publications, documents or things and the text of the present document, the definition or use of the term in the present document shall prevail.

DETAILED DESCRIPTION OF EXEMPLARY EMBODIMENTS

In one embodiment of the invention, a data management system for providing daily usage information alongside the utility bill has some or all of the following seven elements, which may be independent or combined in some fashion:

1) An interface to a data collection system to receive detailed metered usage data, 2) An interface to a utility system to provide customer and billing information, 3) An application that links the usage and billing data 4) An application that links the usage and source generation data or carbon emissions data 5) An application that converts the data from numerical to graphical form, 6) An application that prints the graphical form in hardcopy or electronically, and 7) An application that coordinates delivery of the graphical form to the customer on or alongside the bill.

Figure 1:
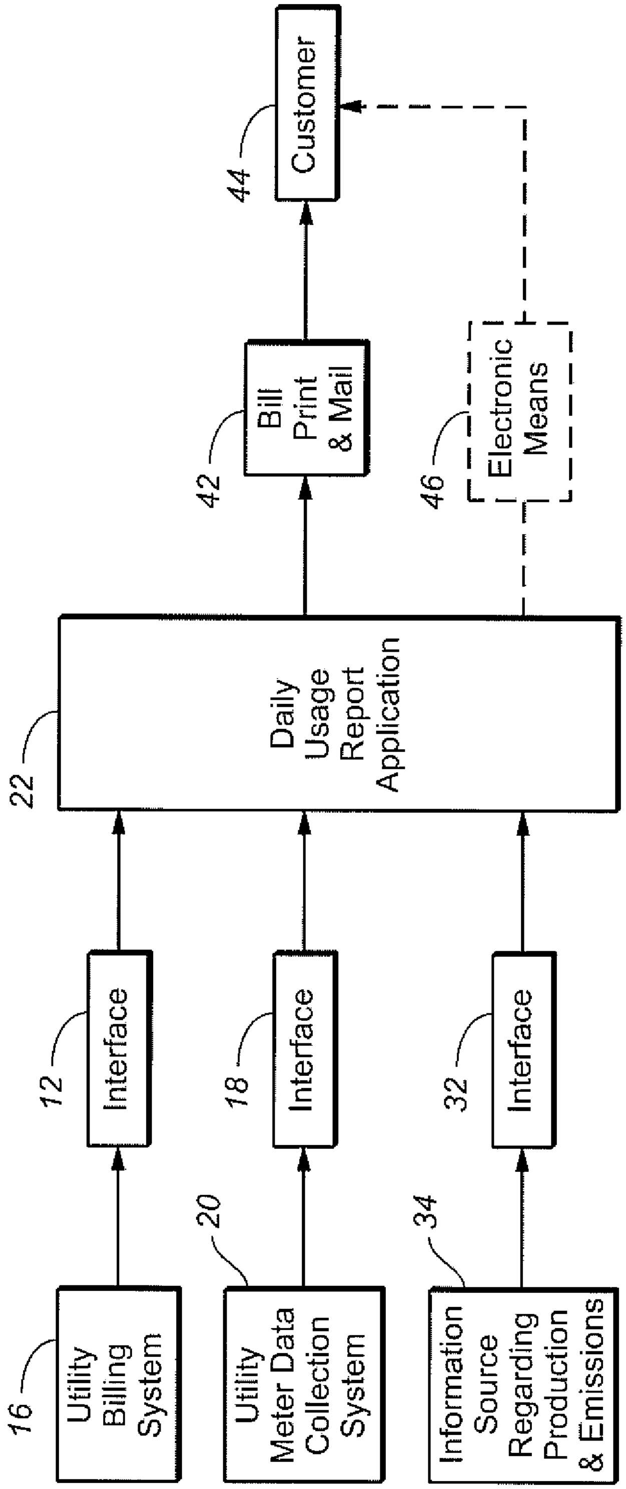
FIG. 1 is a flow diagram of a Usage Reporting System useful for illustrating embodiments of the invention.
Figure 2:
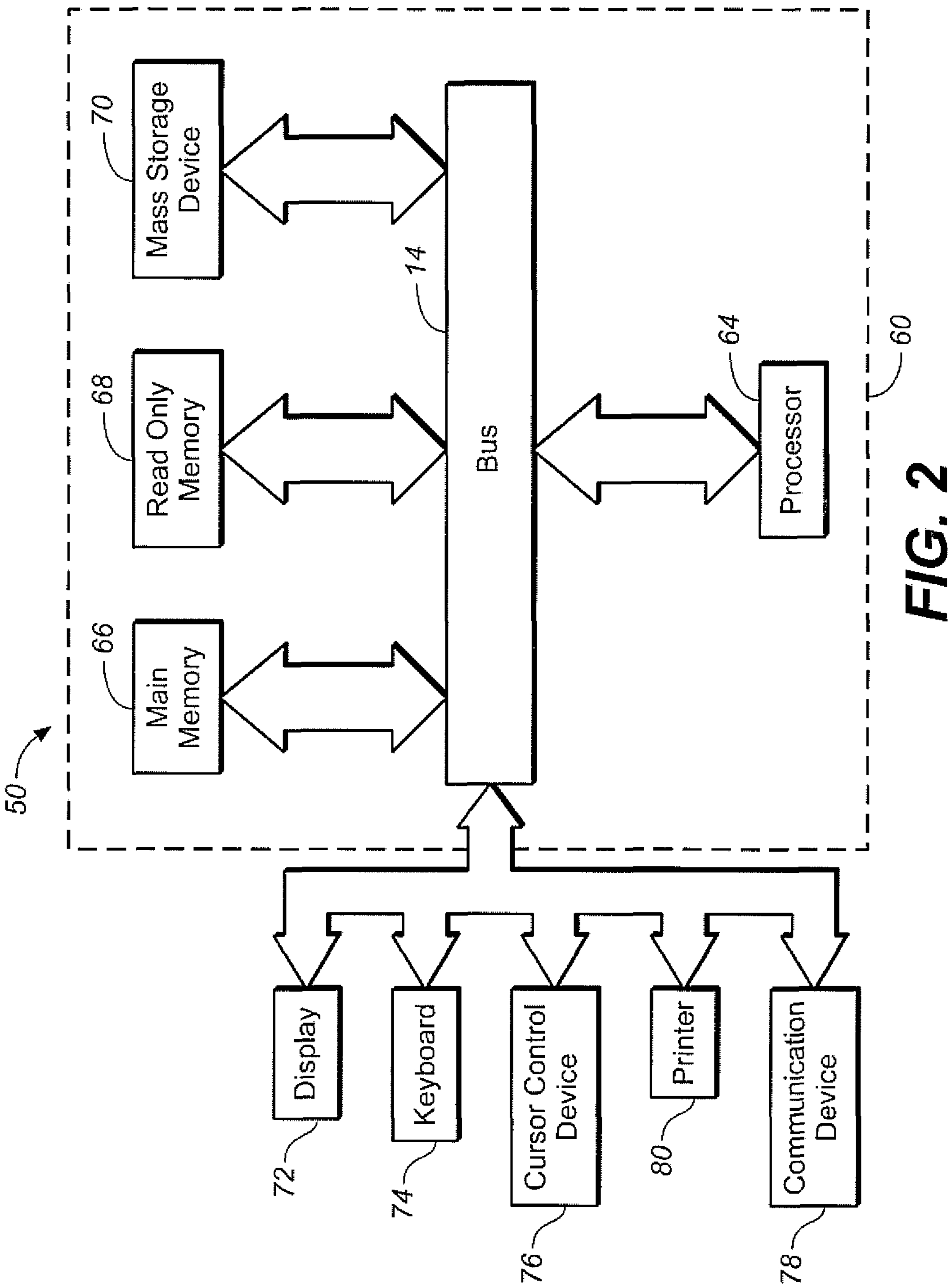
FIG. 2 is an example of a computer system for implementing the meter data management computer system of FIG. 1.

FIG. 1 is a block diagram of a Usage Reporting System useful for illustrating embodiments of the invention containing at least some of the above seven components. An interface 12 to the meter data collection system 16 (or a repository that stores data from such a system) receives the detailed usage data. Another interface 18 receives information, typically from the utility billing system 20, that specifies the starting and ending timestamps for the usage data used to calculate the bill. An application among the Daily Usage Report Applications 22 uses this information to produce a graphical report of the detailed usage that corresponds to the billing period. The graphical report is then delivered to the utility's system (or the system of other retailers of utility commodities) that prints and mails bills or presents the bills to customers electronically. For example, this can be done either on the utility's website or delivered as a file (such as a html file) by electronic mail through the internet. FIG. 2 shows a sample graphical report.

The interface 12 comprises software that performs multiple functions. First, it receives the data from the data collection system 16 in the native format of such system and translates the data into the format used by the software application referred to above for producing a graphical report of the detailed usage that corresponds to the billing period. Second, it includes the transport layer to receive the data files themselves over some medium, generally the Internet, through a secure connection. Third, the interface software manages the communication of the data as needed, such as requesting the data at particular times, recording the data as it is received, verifying that the data sent by the data collection system has been received by the interface software, and similar functions. Interface 18 performs functions similar to interface 12, except that it does so with respect to processing the utility billing data from the utility billing system 20 instead of processing usage data.

Interface 32 performs functions similar to interface 12, except that it does so with respect to processing the production and emission data from the utility billing system 34 instead of processing usage data. Reports are printed on bills or papers suitable for use as inserts to be mailed with bills as controlled by the software application 42 by means of a printer 80 illustrated in FIG. 2. Application 42 also controls the mailing process of bills (e.g. sorting out billing information and names and addresses of customers 44 to be printed, and printing the appropriate billing information, customer name and mailing address). Alternatively, the graphical report is then delivered along with the utility bill to customers electronically through electronic means 46. For example, electronic means 46 of FIG. 2 can include the utility's website on the internet which will allow access by customers through a log in procedure. Or the graphical report may be delivered along with the utility bill as a file (such as a html file) by electronic mail through the internet. In this case the electronics means 46 includes a browser application and the internet. One of the applications 22 will first convert the graphical report and the utility bill into the appropriate file format before they are delivered electronically.

FIG. 2 is a block diagram of a computer system suitable for implementing the data management computer system of FIG. 1. As shown in FIG. 2, the computer system 50 includes a computer bus 14. The various applications 22, 42 and/or 46 are software stored in the mass storage device 70. Processor 64 reads the application software from device 70 into the main memory 66 and executes the code in the software in a manner known to those skilled in the art to perform the various functions described herein. Utility usage data, billing data and production and emissions data may reside in the mass storage device 70. The computer system 50 may be operated by the user via keyboard 74 and cursor control device 76. Computer system 50 communicates with external systems such as external systems 16, 20 and 34 (as well as the customer in the case of electronic delivery) in FIG. 1 through communication device 78, which may be a modem or a wireless communication device such as WI-FI, Blue Tooth, infrared systems, or radio waves systems. Display 72 and printer 80 may be used to print or display information present on the bus 14, such as graphical reports. Such printed or displayed information will enable the operator to perform various functions.

Figure 3:
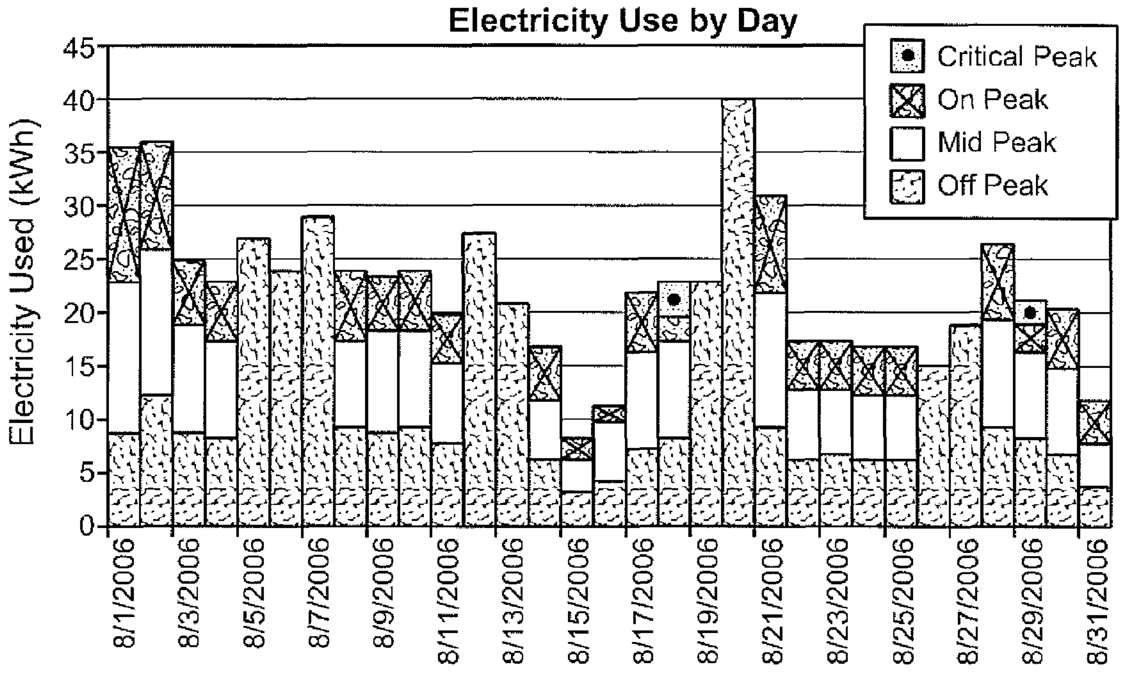
FIG. 3 is a graphical plot of a Sample Daily Electrical Usage Data Graphical Form useful for illustrating embodiments of the invention.

FIG. 3 is a graphical plot of a Sample Daily Electrical Usage Data Graphical Form useful for illustrating embodiments of the invention. One of the applications 22 determines from the utility usage data received through interface 12 from system 16, a particular customer's daily utility usage during four different periods, or some subset thereof: critical peak, on peak, mid-peak and off peak. The utility usage data received includes periodic utility meter readings of a frequency not less frequent than daily, such as meter readings every hour, half hour or fifteen minutes, for example. The twenty four hour period of each day is then separated into the four different time zones (or subset thereof): critical peak, on peak, mid-peak and off peak. Then the utility usage data within each day of a billing reporting period is obtained by computing the utility usage data within each of the four different time zones of each day. Another one of the applications 22 then converts this information into a graphical plot, such as the one shown in FIG. 3. A graphical form (similar to FIG. 3, except that the ordinate will show costs instead of electricity used) may also be provided to display daily cost of the utility usage data of the customer in one or more colors, shadings or markings to indicate portion of cost occurring at different prices for the utility used.

The utility usage data received through interface 12 from system 16 may specify meter read times that are different from those needed to compile the report shown in FIG. 3. For example, the utility billing system 20 may receive usage data in a single monthly usage block starting at a random time on the first day of the billing month and ending at a random time on the last day of the billing month, whereas the detailed usage data specified are specified in terms of hourly intervals on the hour. The timestamps so specified would not conform to the billing period, since the start and stop times for the billing period are not on the hour. The graphical plot in FIG. 3 shows a billing period of 31 whole days, from August $1^{st}$ to August $31^{st}$, without any partial days. Thus, one of the applications 22 will need to conform or synchronize the utility usage data with the different time zones, as well as with the billing time period of August $1^{st}$ to August $31^{st}$, before the data is ready to be converted and printed in graphical form such as the one shown in FIG. 3. Where the meter read times do not coincide with the start and end times of time zones, or of the billing time periods, the application performing the synchronization will interpolate the utility usage data obtained at the meter read times to obtain interpolated utility usage data at times that fit the time zone boundaries, or with the billing time period boundaries. In this manner the total daily usage data that conforms to the time zones, and with the billing time period is obtained.

Once the data is in the right format, software 42 then causes printer 80 in FIG. 2 to print the graphical plot on customer bills or papers suitable for use as inserts to be mailed with bills. Having the graphical plot on customer bills or inserts thereof is particularly convenient for customers, since they will be able to monitor their usage pattern along with the total utility costs for the billing period in one sitting, with no need to log onto any website, or to figure out how the data shown on the website correlates with their utility costs of the billing period.

For easier reading, the usage for holidays or weekend days may be marked using a color, shading or other markings different from that for work days or week days.

The link between utility usage and climate change has been recognized by the public. This has led to a general awareness that every person on the planet should reduce the carbon emission footprint imposed by him or her. Many consumers would like to know the individualized energy usage data with quantities of carbon emissions caused by individualized energy usage. In this way consumers can understand the direct connection between their energy usage behavior and climate change, and are in a position to reduce their carbon footprint by possibly changing their energy usage pattern.

Thus, in another embodiment of the invention, as shown in FIG. 1, the amounts of electricity produced by means of different energy sources at the utility serving a customer is provided by system or provider 34 to the applications 22 of computer 50. It is then possible for one of the applications 22 to calculate, from this information from system 34 and the particular customer's usage data from system 20, the amounts of electricity used by the particular customer during each day that are associated with each of two or more of the six energy sources: Natural Gas-Baseload, Natural Gas-Peaking (natural gas plants used only during the peak hours), Coal, Hydro, Nuclear, and Renewable, and the proportions of these amounts to the total amount. This can be done for each day of the billing period, and the result can be converted into graphical form such as the one shown in FIG. 4. Preferably, these amounts associated with different energy sources can be illustrated using different color, shading or other markings. As in the case of the graphical form such as the one shown in FIG. 3, the graphical form such as the one shown in FIG. 4 can also be preferably printed on customer bills or papers suitable for use as inserts to be mailed with bills. The customer will then be able to review his or her electricity usage associated with the different energy sources to get an idea of how environmentally friendly is his or her electricity usage.

In addition to the amounts of electricity produced by means of different energy sources at the utility serving a customer, system 34 can also provide to the applications 22 of computer 50 quantities of carbon emission associated with or attributable to the various methods of electricity generation. One of the applications 22 will then calculate, from such information and the data in FIG. 4, the amounts of carbon emission attributable to the electricity usage of the customer. In this manner, the customer can obtain a clear idea of his, hers or the family's carbon emission footprint. This information can be converted into graphical form such as the one shown in FIG. 5. It will be noted that there is no carbon emission associated with nuclear, hydro or renewable energy sources, so that the electricity use that is accounted for by these energy sources are not shown in FIG. 5. The above results can be refined by taking into account the carbon emissions associated with the one or more sources of electricity generation used for electricity generation and the at least one customer's electricity usage during the critical peak, on peak, mid-peak and off peaks times.

Figure 4:
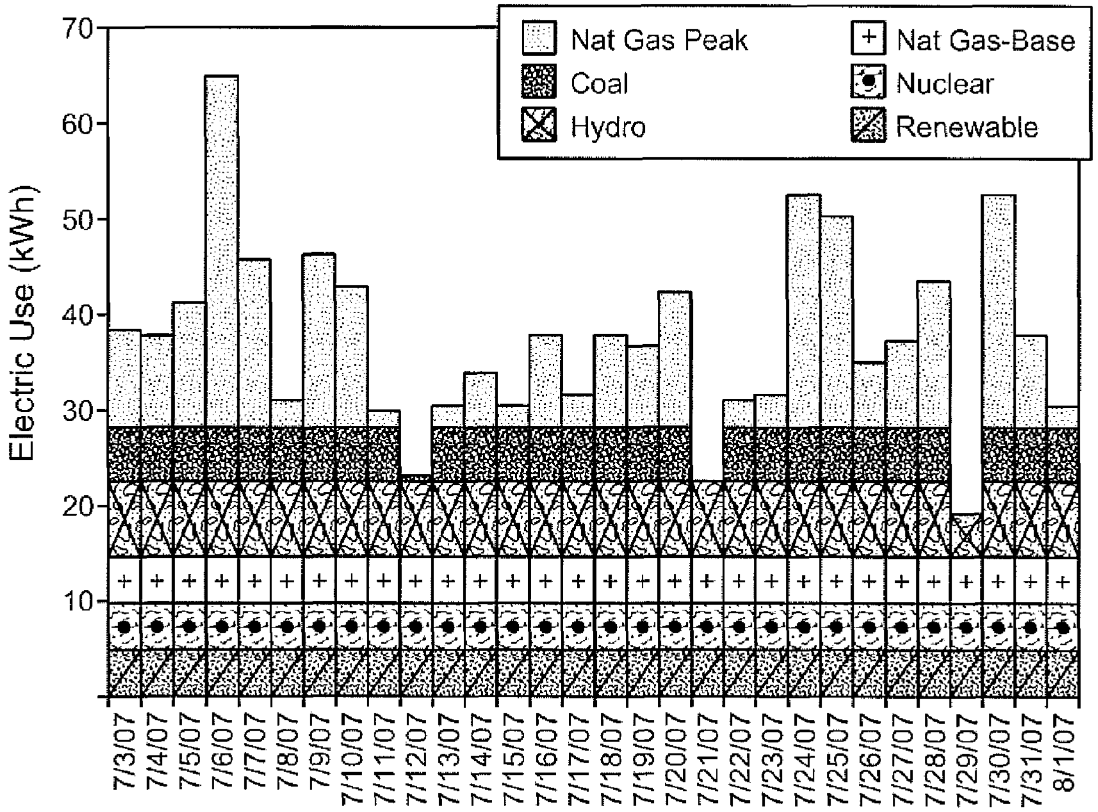
FIG. 4 is a graphical plot of a Sample Source Generation Graphical Form useful for illustrating embodiments of the invention.
Figure 5:
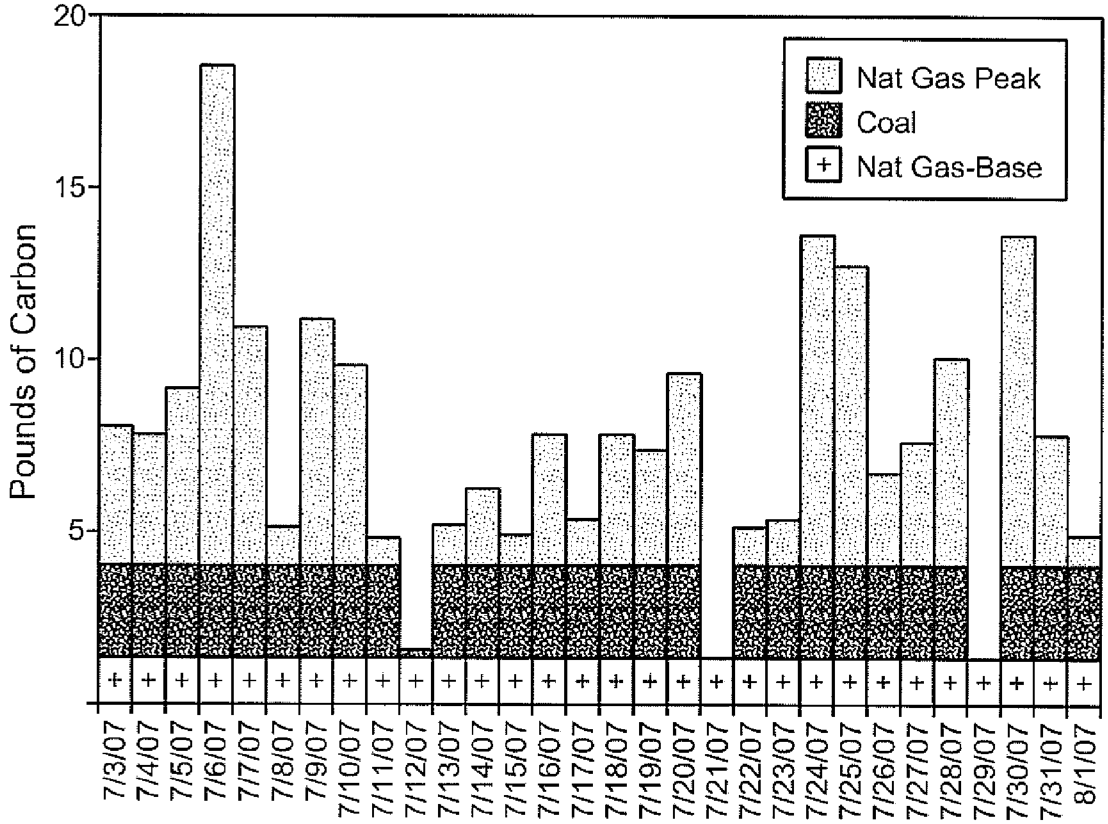
FIG. 5 is a graphical plot of a Sample Carbon Emissions Graphical Form useful for illustrating embodiments of the invention.

As in the case of the graphical forms such as the one shown in FIGS. 3 and 4, the graphical form such as the one shown in FIG. 5 can also be preferably printed on customer bills or papers suitable for use as inserts to be mailed with bills. The customer will then be able to review his or her electricity usage and along with it his, hers or the family's corresponding carbon emission footprint.

In addition to electricity usage, the systems 16 and 20 can also provide the same type of information regarding usage of natural gas and/or water usage and the associated billing information. Plots similar to that in FIG. 3 may then be printed on customer bills or papers suitable for use as inserts to be mailed with bills. It is also possible to calculate the carbon emission by the customer when the customer burns the natural gas, and thus provide a graphical form such as the one shown in FIG. 5 for natural gas usage by the customer. This form can be preferably printed on customer bills or papers suitable for use as inserts to be mailed with bills. The customer will then be able to review his or her gas usage and along with it his, hers or the family's corresponding carbon emission footprint.

Use of the applications described herein enables utilities and other retailers of utility commodities to provide this information to their customers. Until this time, the data provided on bills has been limited to the only the aggregated data for the entire billing period, such as the total electricity use for a month.

While the invention has been described above by reference to various embodiments, it will be understood that changes and modifications may be made without departing from the scope of the invention, which is to be defined only by the appended claims and their equivalents.

It is claimed:

1. A data management system comprising:

a utility meter data collection system interface operative to receive utility usage data of at least one customer in numeric form provided by a utility meter data collection system in usage intervals of not less frequent than daily intervals;

a utility billing system interface operative to receive billing-related data of said at least one customer, said billing-related data of said at least one customer being suitable for use in preparation of a utility bill of said at least one customer for a calendar period;

a conversion application executable on a processor to convert the received utility usage data of said at least one customer from numeric form to a first graphical form that shows total daily usage information within each day of a billing reporting period of the utility bill of said at least one customer;

a synchronization application executable on the processor wherein meter read times of the utility usage data are synchronized via interpolation to fit time zone boundaries of the billing reporting period; and means for delivering the first graphical form to the at least one customer.

2. The data management system of claim 1, said utility usage data of the at least one customer including electricity usage data of the at least one customer and the total daily usage information includes total daily electricity usage of the at least one customer, said data management system further comprising:

a third interface connected to an information provider and executed by a computer system for receiving from said provider electricity generation data regarding quantity and percentages of a utility's total electricity generation attributable to at least two of the following electricity generation sources:

Natural Gas-Baseload, Natural Gas-Peaking, Coal, Hydro, Nuclear, and Renewable;

said processor executing a third application to derive information regarding proportion of the at least one customer's actual daily electricity usage attributable to the sources of electricity generation by said utility from said electricity generation data and the total daily electricity usage of the at least one customer's; and said processor executing a fourth application to create from said information regarding proportion of at least one customer's actual daily electricity usage attributable to the sources of electricity generation by said utility a second graphical form that shows the proportion of the at least one customer's actual daily electricity usage attributable to the sources of electricity generation of said utility.

3. The data management system of claim 2, wherein said electricity generation data include data regarding quantities of carbon emissions per unit of electricity generated associated with the utility's electricity generation sources, said processor executing a fourth application to derive quantities of carbon emissions attributable to the at least one customer's daily electricity usage from said electricity generation data and the at least one customer's electricity usage data.

4. The data management system of claim 3, wherein the at least one customer's electricity usage data and said electricity generation data are for time intervals not less frequent than daily intervals, and said fourth application generates said quantities of carbon emissions attributable to the at least one customer's daily electricity usage in a third graphical form.

5. The data management system of claim 4, wherein the third graphical form is in one or more colors, shadings or markings to indicate the quantities of carbon emissions attributable to the at least one customer's daily electricity usage.

6. The data management system of claim 2, said interface connected to a utility meter data collection system receiving natural gas usage data of the at least one customer, said processor executing a fifth application to derive in graphical form quantities of carbon emissions caused by the at least one customer's daily natural gas usage from the at least one customer's natural gas electricity usage data.

7. The data management system of claim 2, wherein the second graphical form displays the proportion of the at least one customer's actual electricity usage in one or more colors, shadings or markings to indicate the proportion of the at least one customer's actual daily electricity usage produced by the sources of electricity generation of said utility.

8. The data management system of claim 1, utility usage data of said at least one customer including one or more of the following: water, electricity and natural gas, said processor executing a third application to convert the received utility usage data of said at least one customer from numeric form to a second graphical form, wherein said delivering means prints said second graphical form on a printed utility bill or on paper.

9. The data management system of claim 1, said processor executing a third application to produce an electronic copy of the first graphical form and provides the electronic copy to said at least one customer electronically.

10. The data management system of claim 1, wherein the first graphical form displays data differently for weekdays compared to weekend days.

11. The data management system of claim 1, wherein the first graphical form displays data differently for holidays compared to other days.

12. The data management system of claim 1, wherein the first graphical form displays daily cost of the utility usage data of said at least one customer in one or more colors, shadings or markings to indicate portion of cost occurring at different prices for the utility used.

13. The data management system of claim 1, wherein said processor is adapted to execute the conversion application to synchronize the utility usage data to the daily intervals in the calendar period of the printed utility bill to obtain said total daily usage information.

14. The data management system of claim 1, wherein said processor is adapted to execute the first conversion application by employing interpolation in the synchronization.

15. The data management system of claim 1, wherein the delivering means includes a printer printing the first graphical form on a printed utility bill or on a paper suitable for use as an insert accompanying said printed utility bill to be mailed.

16. The data management system of claim 1, wherein the delivering means includes means for delivering the first graphical form with the utility bill electronically to the at least one customer.

17. A data management system comprising:

a utility meter data collection system interface configured to receive electricity usage data of at least one customer;

an information provider interface configured to receive from a provider electricity generation data regarding quantity and percentages of a utility's total electricity generation attributable to at least two of the following electricity generation sources:

Natural Gas-Baseload,
Natural Gas-Peaking,
Coal,
Hydro,
Nuclear, and
Renewable; and a usage attribution application executing on a processor to calculate one or more proportions of the at least one customer's actual daily electricity and attribute those proportions to the sources of electricity generation from the electricity generation data and the electricity usage data.

18. The data management system of claim 17, wherein said electricity generation data include data regarding quantities of carbon emissions per unit of electricity generated associated with the electricity generation sources, said processor executing a second application to derive quantities of carbon emissions attributable to a customer's daily electricity usage from said electricity generation data and the at least one customer's electricity usage data.

19. The data management system of claim 18, wherein the at least one customer's electricity usage data and said electricity generation data are for time intervals not less frequent than daily intervals, and said processor executing said second application to generate said quantities of carbon emissions attributable to a customer's daily electricity usage in graphical form.

20. The data management system of claim 19, wherein the at least one customer's electricity usage data contains data regarding usage data during critical peak, on peak, mid-peak and off peaks times of time periods, and the electricity generation data include data regarding which one or more of the sources of electricity generation were used for electricity generation during said critical peak, on peak, mid-peak and off peaks times, said processor executing said second application to derive quantities of carbon emissions attributable to a customer's daily electricity usage by taking into account the carbon emissions associated with the one or more sources of electricity generation used for electricity generation and the at least one customer's daily electricity usage during said critical peak, on peak, mid-peak and off peaks times.

21. The data management system of claim 19, said interface connected to a utility meter data collection system receiving natural gas usage data of the at least one customer, said processor executing said second application to derive in graphical form quantities of carbon emissions attributable to a customer's daily natural gas usage from the at least one customer's natural gas electricity usage data.

22. A data management method comprising:

receiving at a computer system utility usage data of at least one customer in numeric form provided by a utility meter data collection system in usage intervals of not less frequent than daily intervals;

receiving at the computer system billing-related data of said at least one customer, said billing-related data of said at least one customer being suitable for use in preparation of a printed utility bill of said at least one customer for a calendar period;

the computer system converting the received utility usage data of said at least one customer from numeric form to a graphical form that shows total daily usage information within each day of a billing reporting period of the printed utility bill of said at least one customer;

the computer system synchronizing via interpolation meter read times of the utility usage data to fit time zone boundaries of the billing reporting period; and the computer system printing the graphical form on said printed utility bill or on a paper suitable for use as an insert accompanying said printed utility bill to be mailed to the at least one customer.

23. A data management method comprising:

receiving at a computer system electricity usage data of at least one customer;

receiving at the computer system from a provider electricity generation data regarding quantity and percentages of a utility's total electricity generation attributable to at least two of the following electricity generation sources:

Natural Gas-Baseload, Natural Gas-Peaking, Coal, Hydro, Nuclear, and Renewable; and the computer system calculating one or more proportions of the at least one customer's actual daily electricity usage and attributing those proportions to the sources of electricity generation from the electricity generation data and the electricity usage data.

24. The data management method of claim 23, wherein said electricity generation data include data regarding quantities of carbon emissions per unit of electricity generated associated with the electricity generation sources, said data management method further comprising the computer system calculating quantities of carbon emissions attributable to a customer's daily electricity usage from said electricity generation data and the at least one customer's electricity usage data.

25. The data management system of claim 1, wherein a processor executes the conversion application to interpolate the utility usage data so as to synchronize the utility usage data to the daily intervals in the calendar period of the printed utility bill to obtain said total daily usage information.

* * * * *